United States Patent [19]

Royalty et al.

[11] Patent Number: 5,465,756
[45] Date of Patent: Nov. 14, 1995

[54] BUTTERFLY VALVE PLATE FOR A PNEUMATIC SURGE VALVE

[75] Inventors: Charles M. Royalty, Tempe; William Traxler; Joseph W. Hough, both of Phoenix, all of Ariz.

[73] Assignee: AlliedSignal Inc., Morris Township, N.J.

[21] Appl. No.: 361,066

[22] Filed: Dec. 21, 1994

[51] Int. Cl.[6] .................................................. F16K 1/22
[52] U.S. Cl. ................................... 137/625.31; 251/305
[58] Field of Search ........................ 137/625.31; 251/305

[56] References Cited

U.S. PATENT DOCUMENTS

| | | |
|---|---|---|
| 1,167,145 | 1/1916 | Baverley . |
| 1,671,069 | 5/1928 | De Wein . |
| 1,744,798 | 1/1930 | Price . |
| 2,271,390 | 1/1942 | Dodson . |
| 2,882,010 | 4/1959 | Bryant . |
| 3,059,897 | 10/1962 | Jensen . |
| 3,238,955 | 3/1966 | Lassiter, Jr. . |
| 3,260,502 | 7/1966 | Plumer . |
| 3,298,677 | 1/1967 | Anderson . |
| 3,357,680 | 12/1967 | Williams .................................. 251/305 |
| 3,442,489 | 5/1969 | Cary et al. . |
| 3,516,640 | 6/1970 | Bryer et al. . |
| 3,627,261 | 12/1971 | Ludeman et al. . |
| 3,677,297 | 7/1972 | Walton . |
| 3,960,177 | 6/1976 | Baumann . |
| 4,691,894 | 9/1987 | Pyötsiä et al. . |
| 4,712,768 | 12/1987 | Herr et al. ............................... 251/305 |
| 4,791,782 | 12/1988 | Seed . |

FOREIGN PATENT DOCUMENTS 0670244   7/1979   U.S.S.R. ................... 251/305

*Primary Examiner*—John C. Fox
*Attorney, Agent, or Firm*—James W. McFarland

[57] ABSTRACT

A butterfly valve plate is provided for use in a pneumatic surge valve or the like, wherein the valve plate is designed for reduced noise with increased mass flow capacity. The valve plate is of the type having an offset stem hub for supporting the valve plate on a pivot stem or shaft for movement between closed and open positions within a flow conduit. A pair of part-circular and generally axially extending acoustic fences are carried respectively at opposite sides of the valve plate in peripheral positions for flow-through passage of air when the valve plate is opened. An enlarged and smoothly contoured noise reduction collar is formed on the stem hub at the downstream side of the valve plate, generally at the periphery thereof to substantially fill and occupy the space between the stem hub and the adjacent end of the downstream-side acoustic fence.

20 Claims, 2 Drawing Sheets

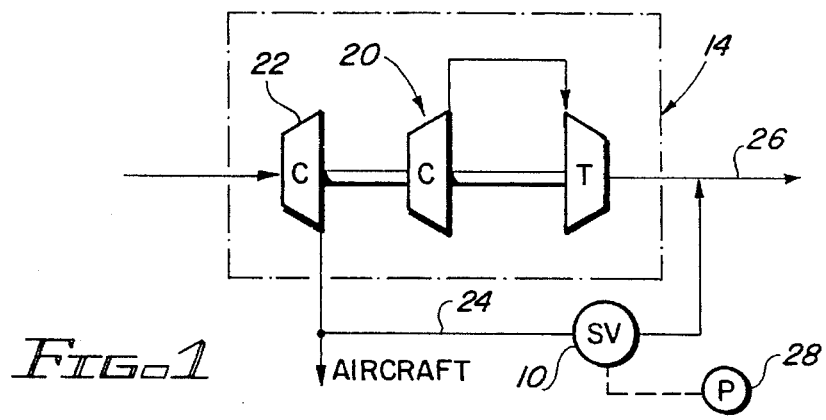
FIG. 1
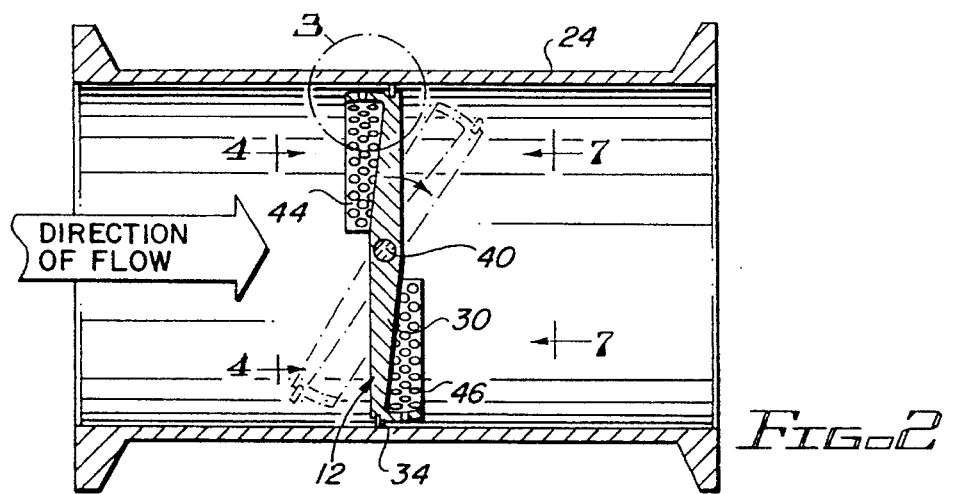
FIG. 2
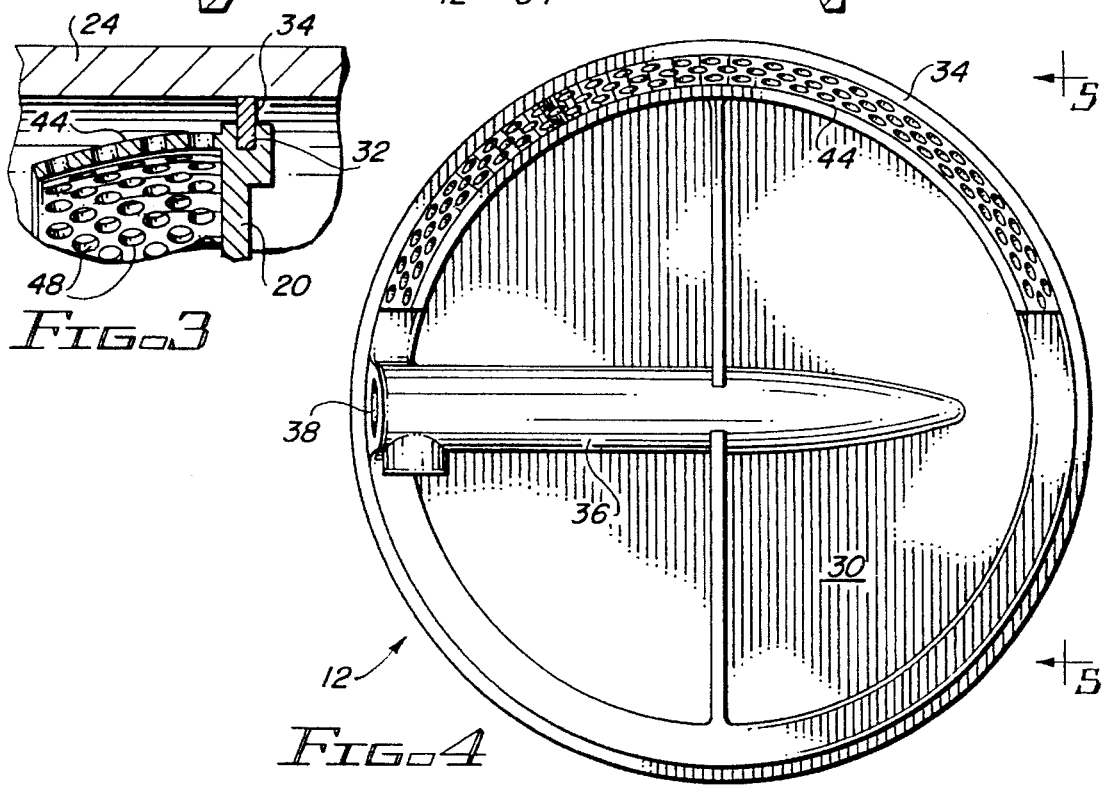
FIG. 3
FIG. 4

5,465,756

BUTTERFLY VALVE PLATE FOR A PNEUMATIC SURGE VALVE

BACKGROUND OF THE INVENTION

This invention relates generally to improvements in butterfly valve plates, particularly of the type used in relatively high mass flow and high pressure pneumatic flow control applications. More specifically, this invention relates to an improved butterfly type valve plate for use in a pneumatic surge valve or the like, wherein the valve plate is designed for reduced noise with increased mass flow capacity.

Butterfly type valve plates are utilized in a variety of pneumatic flow control applications for regulating the flow of a gas such as air along a flow conduit. In general terms, the valve plate comprises a disk of generally circular shape which is mounted on a pivot stem or shaft along the flow conduit for movement between a closed position oriented generally perpendicular to a central axis of the flow conduit, and a full open position extending generally parallel to the flow conduit axis. A system controller is often provided for response to selected system parameters such as pressure or the like to modulate the position of the valve plate between the open and closed positions.

Butterfly type valve plates are commonly used in pneumatic surge valves employed in an auxiliary power unit or system for operating the environmental control system of an aircraft on the ground. Such auxiliary power units comprise a gas turbine engine which drives a compressor to supply compressed air to the aircraft. The actual demand for compressed air may vary in accordance with system load, such that excess air may be provided at varying intervals by the auxiliary power unit. A surge valve responding typically to selected system pressures modulates the position of a butterfly valve plate mounted along a bypass flow conduit through which excess air is relieved to the exhaust side of the gas turbine engine. Such surge valves must be designed with a relatively high mass flow capacity, yet meet increasingly stringent noise limitations.

In the past, valve plates for use in high pressure surge valves have been the subject of considerable design effort to reduce noise by stabilizing flow particularly at the downstream side of the butterfly shaped valve plate. Such designs are typified, for example, by the valve plate structures and related noise suppression devices disclosed in U.S. Pat. Nos. 3,238,955; 3,960,177; and 3,677,297.

A continuing need has existed, however, for further improvements in surge valve design for achieving noise reduction, particularly in a valve plate design which does not decrease but preferably increases mass flow capacity through the surge valve. The present invention provides an improved butterfly valve plate construction which fulfills these needs and provides further related advantages.

SUMMARY OF THE INVENTION

In accordance with the invention, an improved butterfly valve plate is provided for use in a relatively high pressure and relatively high mass flow pneumatic valve, such as a pneumatic surge valve. The valve plate includes an offset stem hub for rotatably supporting the valve plate on a pivot stem or shaft along the length of a pneumatic flow conduit. A pair of part-circular and generally axially extending acoustic fences are carried respectively at the upstream and downstream sides of the valve plate in positions for flow-through passage of air when the valve plate is open. The stem hub at the downstream side of the valve plate includes an enlarged and smoothly contoured, convexly shaped noise reduction collar having a size and shape to substantially occupy and fill the space between the hub stem and the end of the adjacent acoustic fence. In combination, the valve plate including the acoustic fences and the enlarged noise reduction collar on the stem hub has been shown to provide substantial noise reduction at high mass flow rates, with at least some improvement in mass flow capacity.

In the preferred form, the offset stem hub has a convexly shaped geometry of generally tubular configuration extending across a portion of the downstream side of the valve plate, wherein the stem hub defines a stem bore oriented at a small angle to the plane of the valve plate. The acoustic fences have a generally part-spherical shape extending about the periphery of the valve plate, at leading and trailing edges thereof, and respectively disposed on opposite sides of the valve plate to extend through arcuate paths on the order of 150 degrees. The acoustic fences protrude from the valve plate with a generally part-spherical profile having a relatively large plurality of small flow ports formed therein. When the valve plate is rotated within the flow conduit to an open or partially open position, the acoustic fences on the opposite sides of the valve plate are positioned to intercept air flowing past the leading and trailing edges of the valve plate. The acoustic fences function to disrupt development of turbulence at the downstream side of the valve plate, and thereby reduce total valve noise.

The enlarged contoured noise reduction collar is formed on the downstream side of the valve plate, at a location generally adjacent to the valve plate periphery. The collar protrudes from the downstream side of the valve plate, with a convexly curved geometry, and an axial dimension generally corresponding to the axial length of the acoustic fence on the downstream side of the valve plate. The enlarged collar substantially fills and occupies the space between the stem hub and the downstream-side acoustic fence, and is believed to eliminate pockets of flow turbulence in a manner which has been demonstrated to achieve noise reduction while achieving at least some improvement in valve mass flow capacity.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is a schematic diagram of an auxiliary power unit for use in supplying compressed air to an aircraft environmental control system or the like, wherein the auxiliary power unit includes a pneumatic surge valve of the type adapted to include an improved butterfly valve plate constructed in accordance with the invention;

FIG. 2 is a somewhat schematic depiction of the butterfly valve plate mounted along a bypass flow conduit;

FIG. 3 is an enlarged fragmented sectional view of a portion of the valve plate, corresponding generally with the encircled region 3 of FIG. 2;

FIG. 4 is an enlarged upstream side elevation view of the valve plate, taken generally on the line 4—4 of FIG. 2;

DETAILED DESCRIPTION OF THE PREFERRED EMBODIMENT

Figure 5:
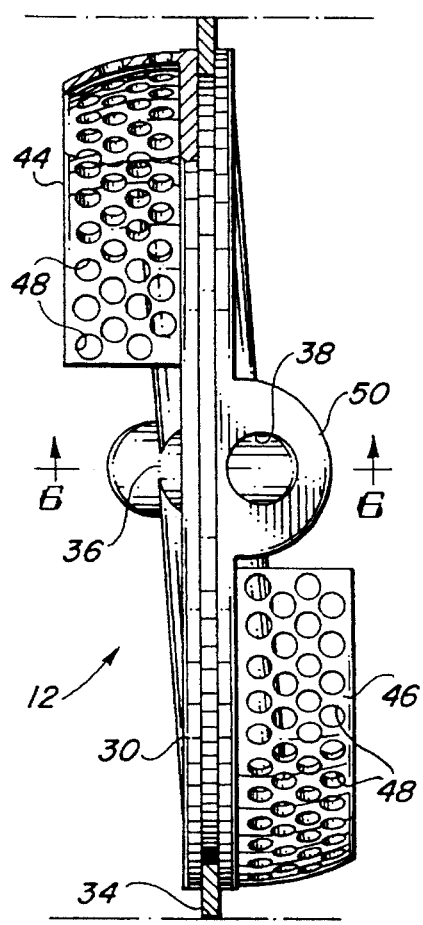
FIG. 5 is an edge elevation view of the valve plate, taken generally on the line 5—5 of FIG. 4.

As shown in the exemplary drawings, a pneumatic surge valve or the like referred to generally by the reference numeral 10 in FIG. 1 includes a butterfly type valve plate 12 (FIG. 2) designed for reduced noise with increased mass flow capacity. The surge valve 10 including the improved valve plate 12 is particularly designed for excess air control in an auxiliary power unit 14 (FIG. 1) of the type used to supply a relatively high mass flow of compressed air to the environmental control system of an aircraft on the ground.

More specifically, as is generally known in the art, the auxiliary power unit 14 comprises a gas turbine engine having a turbocompressor rotating group 20 for driving a compressor 22 used to provide a supply of compressed air to the aircraft, for purposes of operating air-conditioning and other pneumatic systems while the aircraft is on the ground with the aircraft engines shut down. The demand for compressed air may vary widely, however, in accordance with the particular pneumatic system or systems being operated, with the auxiliary power unit 14 being designed to accommodate a maximum demand or load. The surge valve 10 is normally provided as part of the auxiliary power unit system to bypass excess air through a bypass flow conduit 24 to an exhaust conduit 26 of the gas turbine engine. A controller 28 responses to one or more selected system parameters, such as a pressure signal at a selected point in the discharge side of the compressor 22, to modulate the butterfly valve plate 12 between an open and closed position, so that excess compressed air will be diverted through the bypass flow conduit 24.

As shown best in FIGS. 2–5, the valve plate 12 comprises a generally circular disk 30 having a size and shape to substantially close the flow path defined by the flow conduit 24. A circumferential groove 32 formed in the valve plate 12 is provided for seated support of a seal ring 34. The seal ring substantially engages and seals with the inner diameter surface of the flow conduit 24, when the valve plate 12 is in the closed position.

The valve plate 12 is supported within the flow conduit 24 by means of an offset stem hub 36. As shown, the stem hub 36 comprises a generally hollow tubular structure extending diametrically relative to the valve disk 30, but oriented at an angle of about ten degrees to the plane of the valve disk 30, such that a portion of the stem hub 36 protrudes with a smoothly contoured convex shape from an upstream side (FIG. 4) of the valve plate and another portion of the stem hub 36 protrudes with a smoothly contoured convex shape from a downstream side (FIG. 7) of the valve plate. The stem hub defines an internal bore 38 for receiving an actuator stem or shaft 40 (FIG. 2), with a set screw 42 (FIG. 7) or the like securing the stem hub 36 onto the shaft 40 for rotation therewith. The shaft 40 is rotatably displaced by the controller 28 for rotatably modulating the position of the valve plate 12 between the open and closed positions.

The valve plate 12 additionally includes a pair of part-circular acoustic fences 44 and 46 which protrude generally in the axial direction from the upstream and downstream sides of the valve plate 12, respectively. Both of these acoustic fences 44, 46 are secured to the valve plate 12 near the periphery thereof at opposite sides of the valve plate, in a symmetric relation to the stem hub 36. That is, one of the acoustic fences 46 is mounted on the upstream side of the valve plate to extend through a part-circle increment of less than 180 degrees, and preferably about 140 to 150 degrees, with the opposite ends thereof spaced from a median axis defined by the stem hub 36. The other acoustic fence is symmetrically positioned with a similar shape to extend axially from the opposite side of the valve plate.

Figure 7:
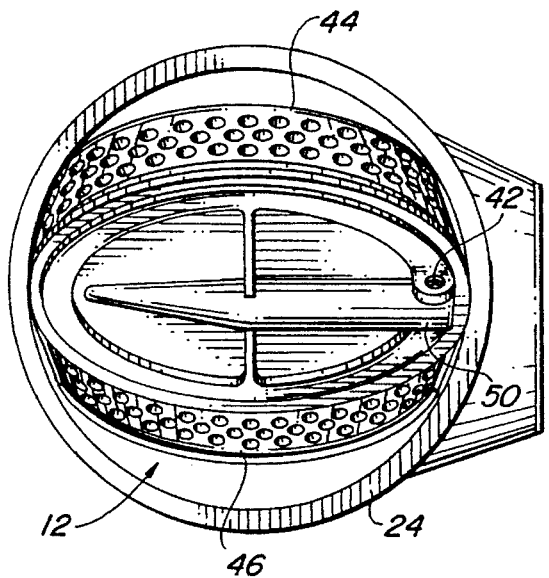
FIG. 7 is a downstream side elevation view of the valve plate, taken generally on the line 7—7 of FIG. 2, but showing the valve plate in a partially open position.

The acoustic fences 44 and 46 each include a large plurality of small flow ports 48. The fences 44, 46 are oriented relative to the direction of opening movement of the valve plate 12, so that the two fences 44, 46 project with at least some radial component into the stream of air flowing between the valve plate periphery and the internal surfaces of the flow conduit 24. As shown in FIG. 7, this functional orientation is achieved by forming the upstream fence 44 on an upper portion of the valve plate, while forming the downstream fence 46 on a lower portion of the valve plate, and then rotating the valve plate in a clockwise direction as viewed in FIG. 2. In this orientation, the acoustic fences intercept the air flow, with the flow ports 48 functioning to disrupt turbulence as the compressed air flows at high pressure and at a high flow rate past the valve plate, with the result that overall noise generation is significantly reduced.

Figure 6:
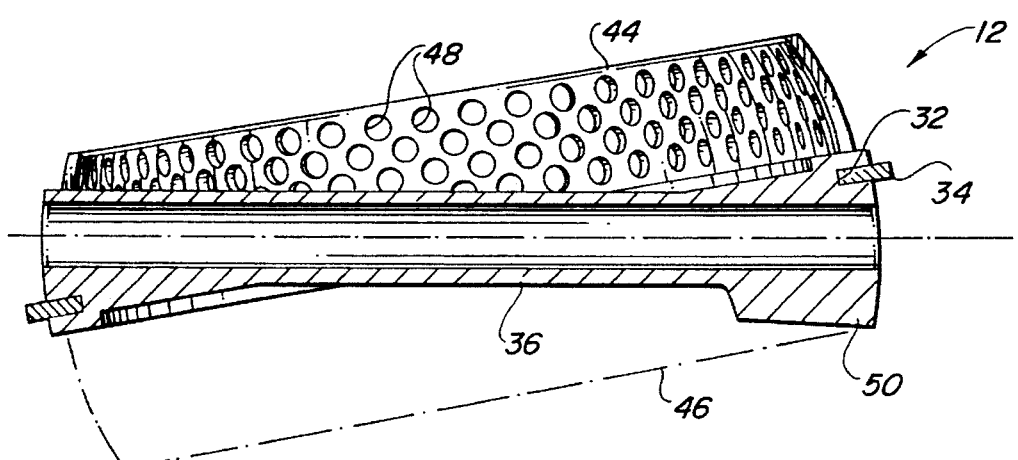
FIG. 6 is a horizontal sectional view taken generally on the line 6—6 of FIG. 5.

In accordance with a primary aspect of the present invention, the configuration of the stem hub 36 is modified on the downstream side of the valve plate 12, in the vicinity of the downstream acoustic fence 46, to achieve further improvements in noise suppression, with a counterpart improvement in mass flow capacity. Specifically, the portion of the stem hub 36 disposed on the downstream side of the valve plate 12, generally at the periphery of the valve plate, includes an enlarged and smoothly contoured noise reduction collar 50 (FIGS. 5–7) of a generally convexly curved shape, preferably in the form of a tubular enlargement at the end of the stem hub 3 6. The overall size and shape of this collar is chosen to substantially fill and occupy the space between the stem hub 36 and the adjacent end of the downstream fence 46, while additionally providing an axial dimension substantially conforming to the axial dimension of the fence. With this geometry, further improvements in noise reduction with unexpected counterpart increases in valve mass flow capacity, have been demonstrated.

A variety of modifications and improvements to the butterfly valve plate of the present invention will be apparent to those skilled in the art. Accordingly, no limitation on the invention is intended by way of the foregoing description and accompanying drawings, except as set forth in the appended claims.

What is claimed is:

1. A butterfly valve plate, comprising:

a generally circular valve disk having an upstream side and a downstream side;

means for mounting said valve disk within a flow conduit for movement between a closed position and an open position respectively to substantially prevent and permit fluid flow through the flow conduit, said mounting means including a generally diametrically extending stem hub on said valve disk for receiving an actuator shaft for rotatably supporting said valve disk within the flow conduit, said stem hub defining a smoothly contoured and generally convex protrusion on at least a portion of said downstream side of said valve disk; and a pair of perforated, part-circular acoustic fences disposed generally at the periphery of said valve disk respectively on said upstream and downstream sides thereof, said fences being positioned generally in symmetric relation to and on opposite sides of a central axis defined by said stem hub;

said stem hub including a noise reduction collar of generally convexly curved shape on said downstream side of said valve disk generally at the periphery thereof and having a size and shape to substantially fill the space between said stem hub and the adjacent end of said downstream-side acoustic fence.

2. The butterfly valve plate of claim 1 wherein said stem hub is formed on an axis offset at a small angle relative to said valve disk.

3. The butterfly valve plate of claim 2 wherein said small angle is about ten degrees.

4. The butterfly valve plate of claim 1 wherein each of said acoustic fences extends through a part-circle increment of about 150 degrees.

5. The butterfly valve plate of claim 1 wherein said noise reduction collar extends axially from the downstream side of said valve disk with an axial dimension substantially conforming to the axial dimension of said downstream-side acoustic fence.

6. The butterfly valve plate of claim 1 wherein said acoustic fences each have a generally part-spherical shape.

7. The butterfly valve plate of claim 1 further including a peripheral seal member on said valve disk for sealingly engaging the flow conduit when said valve disk is in the closed position.

8. A butterfly valve plate, comprising:

a generally circular valve disk having an upstream side and a downstream side;

means for mounting said valve disk within a flow conduit for movement between a closed position and an open position respectively to substantially prevent and permit fluid flow through the flow conduit, said mounting means including a generally diametrically extending stem hub on said valve disk for receiving an actuator shaft for rotatably supporting said valve disk within the flow conduit, said stem hub defining a smoothly contoured and generally convex protrusion on at least a portion of said downstream side of said valve disk; and a perforated part-circular acoustic fence generally at the periphery of said valve disk on said downstream side thereof, said fence being positioned generally in symmetric relation to a central axis defined by said stem hub and extending through a part-circle increment of less than 180 degrees;

said stem hub including a noise reduction collar of generally convexly curved shape on said downstream side of said valve disk generally at the periphery thereof and having a size and shape to substantially fill the space between said stem hub and the adjacent end of said acoustic fence.

9. The butterfly valve plate of claim 8 wherein said stem hub is formed on an axis offset at a small angle relative to said valve disk.

10. The butterfly valve plate of claim 9 wherein said small angle is about ten degrees.

11. The butterfly valve plate of claim 8 wherein said acoustic fence extends through a part-circle increment of about 150 degrees.

12. The butterfly valve plate of claim 8 wherein said noise reduction collar extends axially from the downstream side of said valve disk with an axial dimension substantially conforming to the axial dimension of said acoustic fence.

13. The butterfly valve plate of claim 8 further including a peripheral seal member on said valve disk for sealingly engaging the flow conduit when said valve disk is in the closed position.

14. In a pneumatic surge valve having a flow conduit and a butterfly valve plate rotatably mounted within the flow conduit for movement between a closed position and an open position, an improved valve plate comprising:

a generally circular valve disk having an upstream side and a downstream side;

means for mounting said valve disk within said flow conduit for movement between a closed position and an open position respectively to substantially prevent and permit fluid flow through the flow conduit, said mounting means including a generally diametrically extending stem hub on said valve disk for receiving an actuator shaft for rotatably supporting said valve disk within the flow conduit, said stem hub defining a smoothly contoured and generally convex protrusion on at least a portion of said downstream side of said valve disk; and a pair of perforated, part-circular acoustic fences disposed generally at the periphery of said valve disk respectively on said upstream and downstream sides thereof, said fences being positioned generally in symmetric relation to and on opposite sides of a central axis defined by said stem hub;

said stem hub including a noise reduction collar of generally convexly curved shape on said downstream side of said valve disk generally at the periphery thereof and having a size and shape to substantially fill the space between said stem hub and the adjacent end of said downstream-side acoustic fence.

15. The valve plate of claim 14 wherein said stem hub is formed on an axis offset at a small angle relative to said valve disk.

16. The valve plate of of claim 15 wherein said small angle is about ten degrees.

17. The valve plate of claim 14 wherein each of said acoustic fences extends through a part-circle increment of about 150 degrees.

18. The valve plate of claim 14 wherein said noise reduction collar extends axially from the downstream side of said valve disk with an axial dimension substantially conforming to the axial dimension of said downstream-side acoustic fence.

19. The valve plate of claim 14 wherein said acoustic fences each have a generally part-spherical shape.

20. The valve plate of claim 14 further including a peripheral seal member on said valve disk for sealingly engaging the flow conduit when said valve disk is in the closed position.

* * * * *